United States Patent [19]

Statkus

[11] Patent Number: 4,804,303

[45] Date of Patent: Feb. 14, 1989

[54] ATTACHMENT BLOCK ASSEMBLY

[75] Inventor: Robert J. Statkus, Leicester, Mass.

[73] Assignee: TRW, Inc., Cleveland, Ohio

[21] Appl. No.: 47,314

[22] Filed: May 8, 1987

[51] Int. Cl.⁴ .............................................. F16B 13/04
[52] U.S. Cl. ........................................ 411/41; 411/48;
411/182; 411/908
[58] Field of Search ........................ 411/39, 40, 41, 45,
411/46, 48, 182, 908, 52, 53, 50, 49

[56] References Cited

U.S. PATENT DOCUMENTS

| | | | |
|---|---|---|---|
| 2,788,047 | 4/1957 | Rapata | 411/182 |
| 3,153,975 | 10/1964 | Rapata | 411/45 |
| 3,508,593 | 4/1970 | Gill | 411/182 |
| 4,405,272 | 9/1983 | Wollar | 411/41 |
| 4,571,134 | 2/1986 | Beglinger et al. | 411/41 |

Primary Examiner—Neill R. Wilson
Attorney, Agent, or Firm—Fay, Sharpe, Beall, Fagan, Minnich & McKee

[57] ABSTRACT

An attachment block structure for connection through a preformed opening in a first workpiece to provide a fastener receiving surface to permit attachment of a second workpiece to the first workpiece comprises a first plastic member having a plurality of resilient legs depending from a radially extending flange. Latch elements are carried by the legs for retaining the first member in the preformed opening. The flange has a central passageway and a radial extent greater than the preformed opening to define a limit for movement of the first member into the preformed opening. A second plastic member is associated with the first member and has a body with an exterior surface sized to be closely received in the passageway of the first member to prevent radially inward deflection of the legs when the second member is inserted in the passageway. Cooperating surface configurations on the exterior of the elongated body and the interior of the resilient legs act to prevent rotation or axial withdrawal of the second member relative to the first member after insertion.

7 Claims, 1 Drawing Sheet

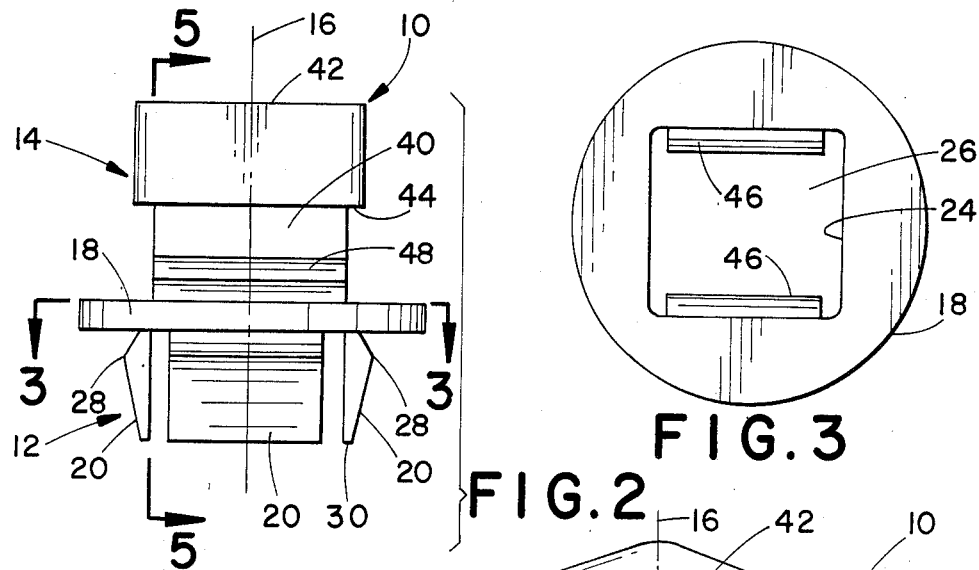
FIG.2
FIG.3
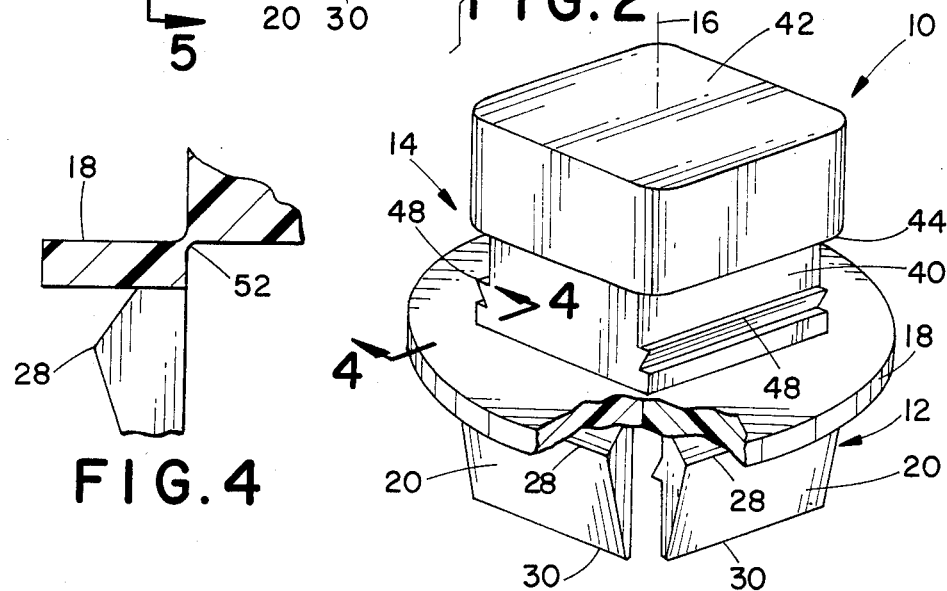
FIG.4
FIG.1
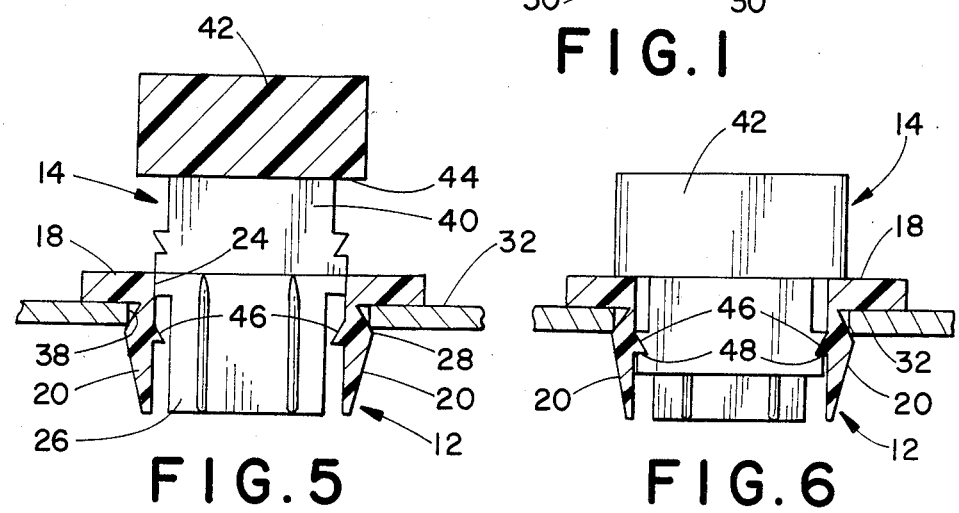
FIG.5
FIG.6

ATTACHMENT BLOCK ASSEMBLY

BACKGROUND OF THE INVENTION

The subject invention is directed toward the fastener art and, more particularly, to an attachment block structure for providing a fastener receiving surface on a workpiece.

The invention is especially suited for use in the motor vehicle industry to facilitate connection of body panels to vehicle frames and will be described with reference thereto; however, as will become apparent, the invention is capable of broader application and could be used for providing a connection surface on a variety of types of workpieces or frame structures.

During manufacture of vehicle bodies having stamped metal body panels, a variety of techniques are successfully used to join the panels to each other and to the interior frame and support members. Typically, these techniques have included welding, bolting through slotted openings and bolting to precisely located studs welded to the subjacent support members.

With the advent of the use of molded plastic body panels, the prior connecting techniques have not generally been satisfactory. For example, welding cannot normally be used. Moreover, the nature of plastic body panels is such that a very slight misalignment of the mounting openings or studs produces readily visible surface distortion on the panel.

One connecting method which has been used with some success for plastic body panels has been to join relatively large attachment blocks to the subjacent frame or support. After the panels have been precisely positioned, threaded connecting screwd are driven through the panels and into the blocks. Because the blocks have a relatively large screw receiving surface area they do not have to be located with extreme precision.

Attaching blocks of this general type are shown and discussed in U.S. Pat. No. 4,438,971 to Zaydel, et al. The blocks shown therein comprise an open topped, cup-shaped metal housing which is filled with a plastic. The metal housing is joined to the subajacent frame with the plastic filling facing outwardly for receiving the panel connecting screws. The plastic filling can, of course, be readily drilled or machined to allow adjustment of the position of the attached body panel.

The described attaching blocks are definitely an improvement over prior panel attaching methods. One disadvantage is, however, that they require an additional connecting step, i.e., the blocks themselves must be bolted, welded or adhesively bonded to the frame.

BRIEF DESCRIPTION OF THE INVENTION

The subject invention provides and attachment block structure of the general type described which can be quickly and permanently mounted without the welding, bolting or bonding step previously required. In particular, in accordance with the invention, the attachment block structure is arranged for connection through a preformed opening in the frame or subjacent workpiece. The block structure includes a first member having a central axis and a plurality of resilient legs depending from a radially extending flange. The legs have outwardly facing surfaces spaced to generally correspond to the inner periphery of the preformed opening. Latch means are carried on the legs for retaining the first member in the preformed opening. The flange has a radial extent greater than the preformed opening to define a limit for movement of the first member into the preformed opening to assure proper positioning of the latch means. A central passageway extends axially through the flange with the interior surfaces of the legs being aligned with the walls of said passageway to form a continuation thereof. A second member having an elongated body with a central axis and an exterior surface sized to be closely received in the passageway of the first member is inserted in the passageway and acts to prevent radially inward deflection of the legs and release of the latch means. Additionally, cooperating surface means are formed on the exterior of the elongated body and the interior of the resilient legs to prevent rotation or axial withdrawal of the second member relative to the first member.

Preferably, both the first and second members are injection molded from a suitable plastic. In addition, in accordance with a more limited aspect of the invention, the members are molded as a one-piece unitary structure with the elongated body of a second member positioned in operative but non-inserted alignment with the passageway of the first member. A frangible joint between the two members maintains them in their joined aligned relationship until the first member has been properly inserted in the preformed frame opening. Thereafter, the second member can be driven into the passageway fracturing the frangible joint and causing the second member to move into its final position with both members thus locked in permanent, non-rotatable position in the frame.

As can be seen, installation of the improved attachment block structure can be a simple manual operation. The arrangement is such that the resulting block is permanently and rigidly installed with no undesired movement possible between the two block components or between them and the frame. In addition, the exposed outer end of the assembly can provide a relatively large fastener receiving area which can be drilled or machined as required.

Because installation of the attachment block requires only a non-rotary pushing movement it can also be readily installed with simple automation equipment.

OBJECTS OF THE INVENTION

Accordingly, a primary object of the invention is the provision of an attachment block structure which can be mounted to the frame quickly and simply without the use of special tools, fasteners, or adhesives.

Another object is the provision of an attachment block structure in which the components are maintained in a joined and aligned relationship until final installation.

A further object is the provision of a structure of the type described wherein the components are mechanically interlocked with the workpiece and each other by a simple non-rotary pushing movement.

BRIEF DESCRIPTION OF THE DRAWINGS

The above and other objects and advantages will become apparent from the following description when read in conjunction with the accompanying drawings wherein:

FIG. 1 is a perspective view of an attachment block structure formed in accordance with a preferred embodiment of the invention;

FIG. 2 is a side elevational view of the attachment block structure of FIG. 1;

FIG. 3 is a cross-sectional view taken on line 3—3 of FIG. 2;

FIG. 4 is a partial cross-sectional view taken on line 4—4 of FIG. 1;

FIG. 5 is a cross-sectional view taken on line 5—5 of FIG. 2 but showing the assembly partially molded in a support frame or workpiece; and, FIG. 6 is a view similar to FIG. 5 but showing the components in their final installed position in the frame or workpiece.

Referring more particularly to the drawings wherein the showings are for the purpose of illustrating a preferred embodiment of the invention only and not for the purpose of limiting same, FIGS. 1–3 illustrate the attachment block structure 10 as comprising a first or base component 12 and an associated second component 14. Each of the components 12 and 14 are preferably injection molded from a suitable resinous plastic material such as nylon, polyester or polyethylene. In addition, as will subsequently be discussed, the two components can be separately molded or molded as a unitary structure with a frangible connecting joint between them.

With specific reference to component 12, it will be noted that the component has a central axis 16 with a radially extending circular flange section 18. Flange 18 is relatively rigid and carries a plurality of downwardly extending legs 20. In the embodiment under consideration, there are four of the legs 20. The legs are positioned such that their outer surfaces generally correspond to the periphery of a preformed workpiece opening into which the attachment block assembly is to be mounted. Specifically, as shown, the legs 20 of the preferred embodiment are positioned to generally define the sides of a square.

Referring in particular to FIG. 3, it will be seen that the flange 18 includes a central opening 24 which is axially aligned with the flange and defines an axial passageway 26. The leg 20 is positioned so that their interior surfaces are aligned with the sides of opening 24 and define a continuation of the passageway 26. The exterior of each of the legs 20 is provided with a latch-like protrusion 28. As best seen in FIG. 2, each of the legs 20 is tapered from their lower free end 30 to the associated protrusion 28.

The location of the latch or protuberance 28 is determined by the thickness of the associated workpiece or frame member to which the attachment block assembly is to be mounted. Referring specifically to FIG. 5, component 12 is shown mounted in a frame plate 32. Frame plate 32 is provided with a preformed opening 38 which, as noted earlier, generally corresponds in shape to the exterior pattern defined by the four legs 20. As shown in FIG. 5, the member 12 can thus be inserted into the opening 38. The size and relationship of the legs 20 relative to the opening is such that they must deflect radially inward to allow the member 12 to achieve the fully inserted position shown in FIG. 5. The limit of movement into the opening 38 is, of course, defined by the flange 18 which has its outer periphery located to extend beyond the edge of opening 38. The location of the protuberance 28 is such that the peak of the protuberance engages beneath the surface of the plate or frame member 32. This latches member 12 into the plate. It should, of course, be understood that from the FIG. 5 position it would be possible to withdraw member 12 from the opening by forcibly pulling on the member since the legs could collapse or flex radially inward to permit the protuberance or latch member 28 to ride over the edge of the opening 38.

Member 14 functions to permanently lock member 12 in position in the opening and to define the necessary fastener receiving surface of the attachment block assembly. Specifically, as best shown in FIG. 1, member 14 has an elongated body portion 40 of rectangular cross-section sized so as to be closely received in the passageway 26. Preferably, the member 14 is solid and has a flat upper surface 42 which defines the fastener receiving surface of the assembly. Additionally, a shoulder 44 is formed about the upper end of member 14 to limit its movement into the passageway 24. As can be appreciated, because of the configuration of the elongated portion 40 of member 14 insertion of this portion completely into the passageway 26 prevents the resilient legs 20 from being deflected radially inward to thereby prevent the block assembly from being withdrawn from the preformed opening 38. In addition, in order to permanently lock the member 14 into its final assembly position within the passageway 26, means in the form of interengaging surface configurations are provided on the exterior of the elongated body 40 and the interior surfaces of the legs 20. As shown in FIGS. 1, 5 and 6, at least one opposed pair of the legs 20 are provided with tooth like configurations 36. Corresponding tooth shaped recesses 48 are formed in the exterior of the elongated body section 40. The recesses 48 are located such that when engagement takes place between the teeth 46 and the recesses the shoulder 44 of member 14 is firmly in engagement with the top surface of flange 18. The final installed relationship of the components 12 and 14 is illustrated in FIG. 6. By applying an inwardly directed force on the outer end of member 14, it is driven into the passageway 46 from the aligned position shown in FIG. 5. As the component 14 moves to the final assembled position of FIG. 6, the legs 20 which carry the tooth configurations 46 are cammed outwardly and as member 14 moves to its final position they enter the recesses 48 firmly locking member 14 into the position shown. In this position, both members 14 and 12 are permanently locked into the workpiece or frame 32 in a non-rotatable manner. Additionally, the relationship between components 12 and 14 is such that component 14 cannot be rotated relative to component 12.

As mentioned earlier, the two components 12 and 14 can be molded separately and merely manually aligned for the final installation of the assembly. Preferably, and in accordance with a more limited aspect of the invention. The components are molded as a unitary structure in the aligned relationship shown in FIGS. 1, 2 and 5. Specifically, the two components are molded to provide a frangible connection between the lower edge of the body section 40 and the upper peripheral edge of the opening 26. As shown in FIG. 4, a relatively thin flash like section 52 is molded at least at the corner location to join the two components in the properly aligned position. This frangible section 52 must be designed so as to have sufficient strength to allow normal handling and shipping of the assembly but be sufficiently weak to allow it to be readily fractured by the application of suitable installation force to the outer end of member 14.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. An attachment block structure for connection through a preformed non-circular opening in a first workpiece to provide a fastener receiving surface to permit attachment of a second workpiece to the first workpiece, said attachment block structure comprising:

a first member having a central axis and a plurality of resilient legs depending from a radially extending flange, said legs having outwardly facing surfaces spaced to generally correspond to the inner periphery of said preformed non-circular opening to prevent rotation of said member in said opening and carrying latch means for retaining said first member in said preformed opening, said flange having a radial extent greater than said preformed opening to define a limit for movement of said first member into said preformed opening, a central passageway extending axially through said flange with the interior surfaces of said legs being aligned with the walls of said passageway to form a continuation thereof;

a second member having a solid elongated body with a central axis and having a flat outer end surface of substantial size adapted to define a relatively large fastener receiving surface capable of receiving a screw type fastener in any location on said outlet end surface, said elongated body further having exterior lateral surfaces sized to be closely received in the passageway of said first member to prevent radially inward deflection of said legs when said second member is inserted in said passageway, a shoulder extending radially outwardly adjacent an end of said second member to engage said flange on said first member and limit movement of said elongated body into said passageway; and, cooperating surface means on the exterior of said elongated body and the interior of said resilient legs to prevent rotation or axial withdrawal of said second member relative to said first member after insertion therein to a point to produce engagement between said shoulder and said first member.

2. The attachment block structure as defined in claim 1 wherein said first and second members are molded from plastic and wherein said second member is joined to said first member by frangible joint means which holds said first and second members in operative alignment during insertion of said first member into said preformed opening and which must fracture to allow said elongated body of said second member to be inserted into said passageway of said first member.

3. The attachment block structure as defined in claim 1 wherein said passageway in said first member is rectangular and wherein there are four of said resilient legs with each leg forming a separate side of said passageway.

4. The attachment block structure as defined in claim 3 wherein said cooperating surface means include inwardly extending tooth forms carried on the inner surfaces of at least some of said legs.

5. The attachment block structure as defined in claim 4 wherein said tooth forms are carried on an opposed pair of said legs.

6. The attachment block structure as defined in claim 4 wherein said cooperating surface means includes tooth receiving recesses formed on said elongated body, said tooth receiving recesses being located to engage with said tooth forms on said resilient legs only when said shoulder is in engagement with said flange.

7. The attachment block structure as defined in claim 4 wherein said resilient legs are each tapered and wherein said latch means are spaced from said flange a distance generally corresponding to the thickness of said first workpiece.

* * * * *